United States Patent
Kim et al.

(10) Patent No.: US 10,673,085 B2
(45) Date of Patent: Jun. 2, 2020

(54) METHOD FOR MANUFACTURING ELECTROLYTE MEMBRANE FOR SOLID OXIDE FUEL CELL, ELECTROLYTE MEMBRANE FOR SOLID OXIDE FUEL CELL, SOLID OXIDE FUEL CELL, AND FUEL CELL MODULE

(71) Applicant: LG CHEM, LTD., Seoul (KR)

(72) Inventors: Jong Woo Kim, Daejeon (KR); Jeong Mi Choi, Daejeon (KR); Dong Oh Shin, Daejeon (KR); Changseok Ryoo, Daejeon (KR); Gyunjoong Kim, Daejeon (KR); Kwangwook Choi, Daejeon (KR); Sanghyeok Im, Daejeon (KR); Yeonhyuk Heo, Daejeon (KR); Tai Min Noh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 172 days.

(21) Appl. No.: 15/571,936

(22) PCT Filed: Jun. 10, 2016

(86) PCT No.: PCT/KR2016/006157
§ 371 (c)(1),
(2) Date: Nov. 6, 2017

(87) PCT Pub. No.: WO2017/003109
PCT Pub. Date: Jan. 5, 2017

(65) Prior Publication Data
US 2018/0138535 A1     May 17, 2018

(30) Foreign Application Priority Data
Jun. 30, 2015 (KR) .......................... 10-2015-0093727

(51) Int. Cl.
*H01M 8/1041* (2016.01)
*H01M 8/1086* (2016.01)
(Continued)

(52) U.S. Cl.
CPC ....... *H01M 8/1055* (2013.01); *H01M 8/1016* (2013.01); *H01M 8/1086* (2013.01);
(Continued)

(58) Field of Classification Search
CPC ....... H01M 8/1055; H01M 2008/1095; H01M 8/1253; H01M 8/1086
See application file for complete search history.

(56) References Cited

U.S. PATENT DOCUMENTS 4,360,598 A * 11/1982 Otagiri .................. C04B 35/486
                                                              264/658
5,035,962 A *  7/1991 Jensen ................ H01M 4/9066
                                                              204/291

(Continued)

FOREIGN PATENT DOCUMENTS

EP         2 554 724 A1     2/2013
KR    10-2003-0045324 A     6/2003
(Continued)

OTHER PUBLICATIONS

Machine translation of KR-20110083371-A, Song Han Bok, Korea (Year: 2011).*

(Continued)

*Primary Examiner* — Sarah A. Slifka
*Assistant Examiner* — Brent C Thomas
(74) *Attorney, Agent, or Firm* — Birch, Stewart, Kolasch & Birch, LLP

(57) ABSTRACT

The present specification relates to a method for manufacturing an electrolyte membrane for a solid oxide fuel cell, an electrolyte membrane for a solid oxide fuel cell, a solid (Continued)

oxide fuel cell including the electrolyte membrane, and a fuel cell module including the solid oxide fuel cell.

9 Claims, 7 Drawing Sheets

(51) Int. Cl.
| | |
|---|---|
| *H01M 8/1253* | (2016.01) |
| *H01M 8/1246* | (2016.01) |
| *H01M 8/1231* | (2016.01) |
| *H01M 8/1016* | (2016.01) |
| *H01M 8/1007* | (2016.01) |
| *H01M 8/126* | (2016.01) |
| *H01M 8/1018* | (2016.01) |
| *H01M 8/124* | (2016.01) |

(52) U.S. Cl.
CPC ....... *H01M 8/1231* (2016.02); *H01M 8/1246* (2013.01); *H01M 8/1253* (2013.01); *H01M 8/1007* (2016.02); *H01M 8/126* (2013.01); *H01M 2008/1095* (2013.01); *H01M 2008/1293* (2013.01); *H01M 2300/0074* (2013.01); *Y02E 60/525* (2013.01); *Y02P 70/56* (2015.11)

(56) References Cited

U.S. PATENT DOCUMENTS

| | | | |
|---|---|---|---|
| 2010/0062302 A1* | 3/2010 | Bae | ................ H01M 8/0297 |
| | | | 429/444 |
| 2013/0089485 A1* | 4/2013 | Pan | ................ C01F 17/0043 |
| | | | 423/263 |
| 2013/0122381 A1* | 5/2013 | Kang | ................ H01M 8/06 |
| | | | 429/408 |

FOREIGN PATENT DOCUMENTS

| | | | |
|---|---|---|---|
| KR | 10-2010-0020368 A | | 2/2010 |
| KR | 10-2011-0083371 A | | 7/2011 |
| KR | 20110083371 A | * | 7/2011 |
| KR | 10-2012-0017142 A | | 2/2012 |
| KR | 10-1238887 B1 | | 3/2013 |
| KR | 10-2015-0013998 A | | 2/2015 |

OTHER PUBLICATIONS

Extended European Search Report dated Nov. 22, 2018 for Application No. 16818142.8.
International Search Report, issued in PCT/KR2016/006157 (PCT/ISA/210), dated Aug. 24, 2016.

* cited by examiner

[FIG. 1]
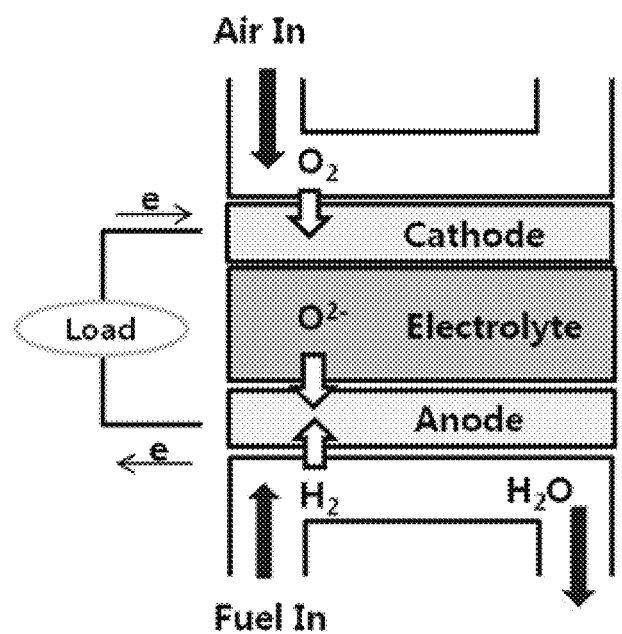

[FIG. 2]
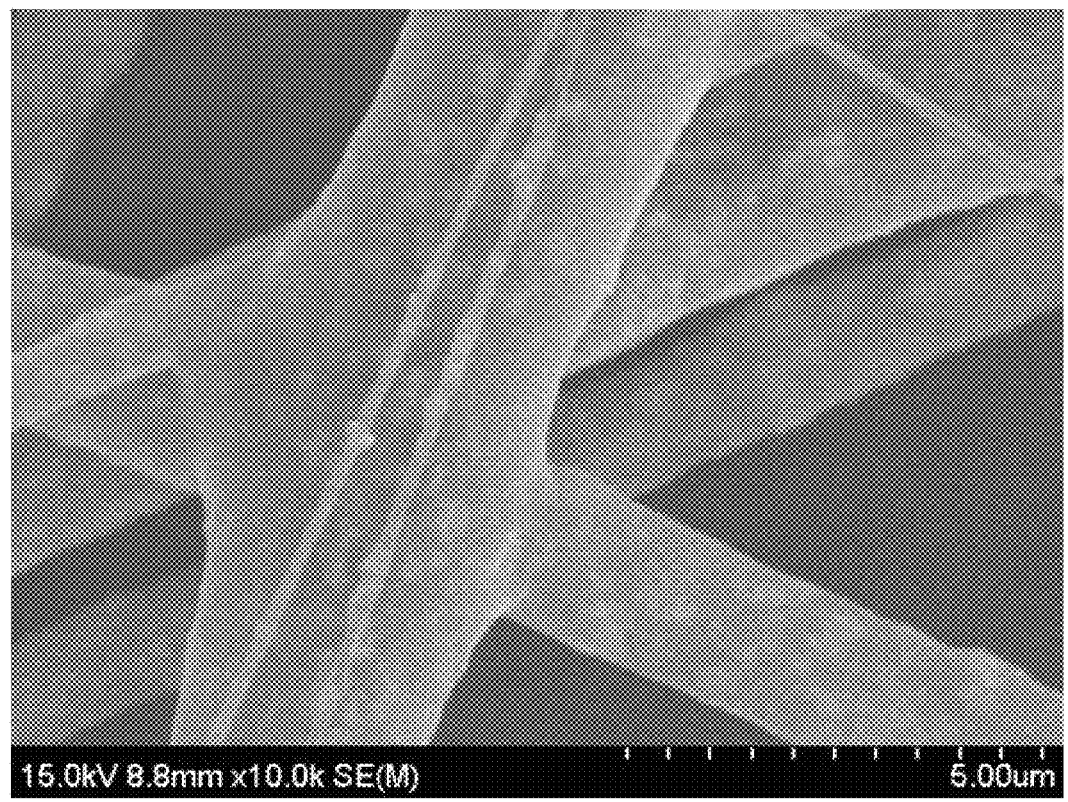

【FIG. 3】
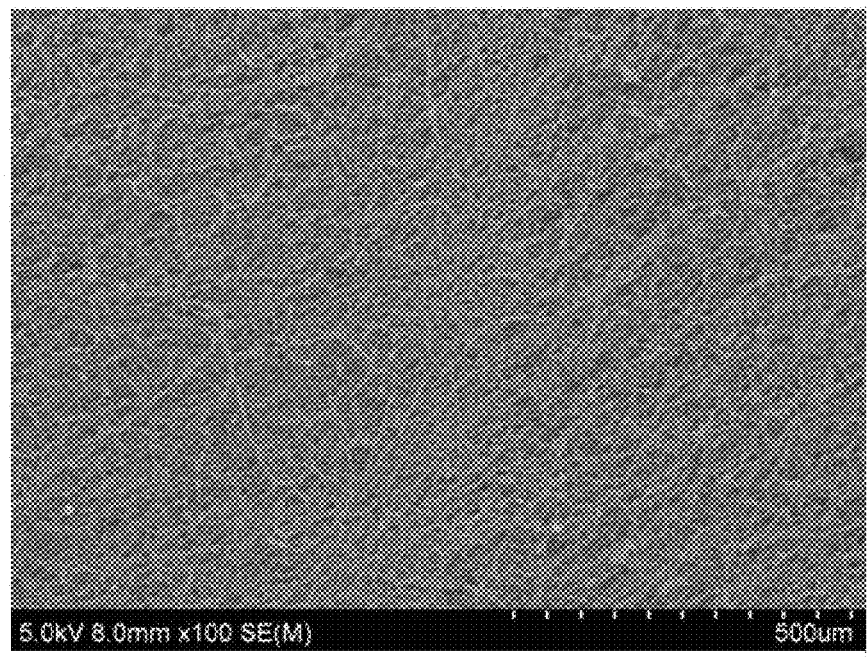
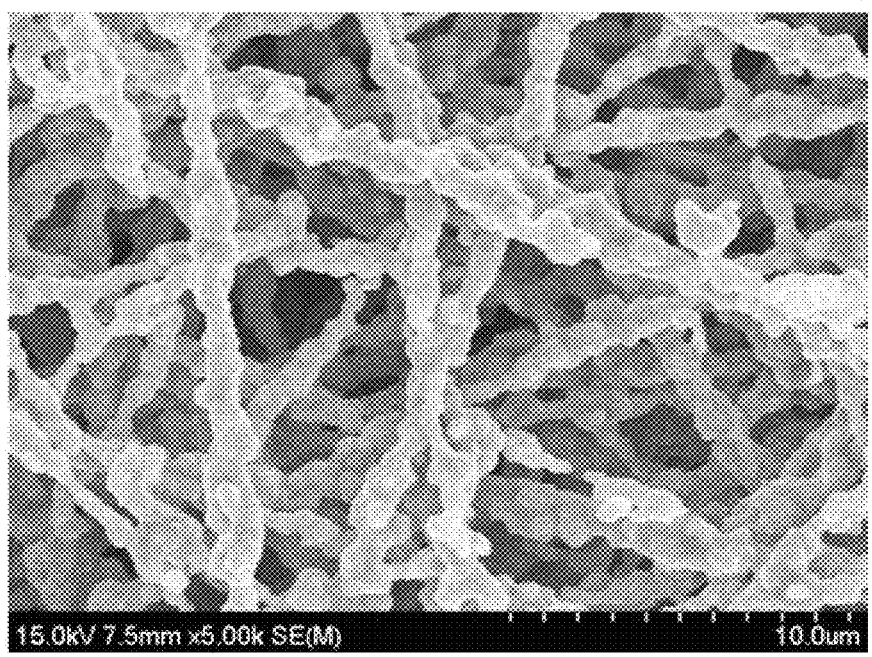

[FIG. 4]
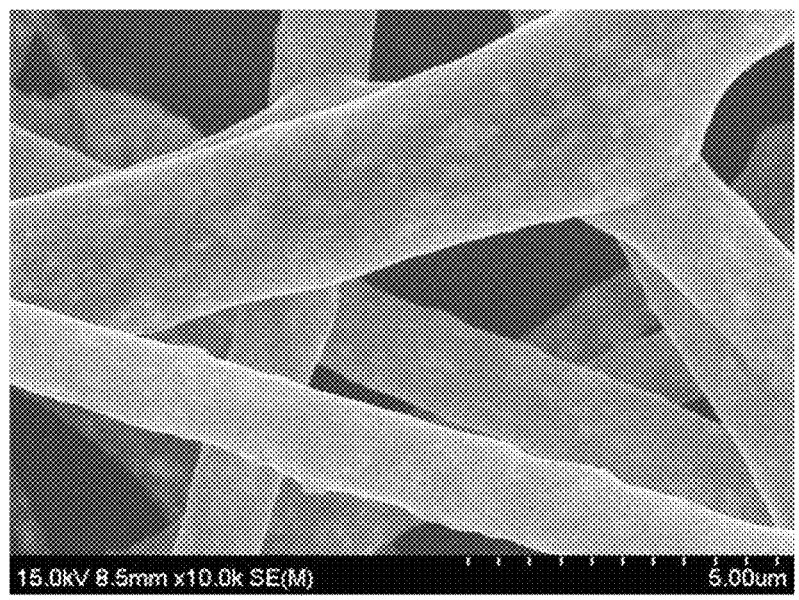

[FIG. 5]
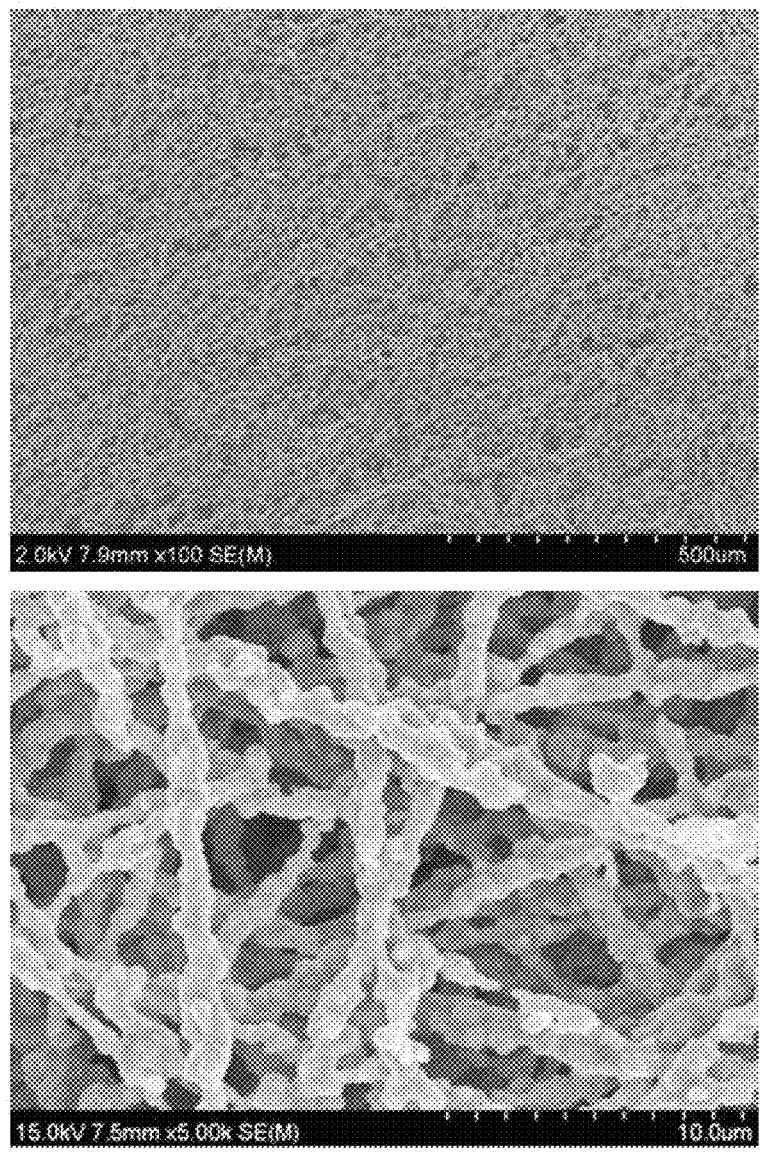

[FIG. 6]
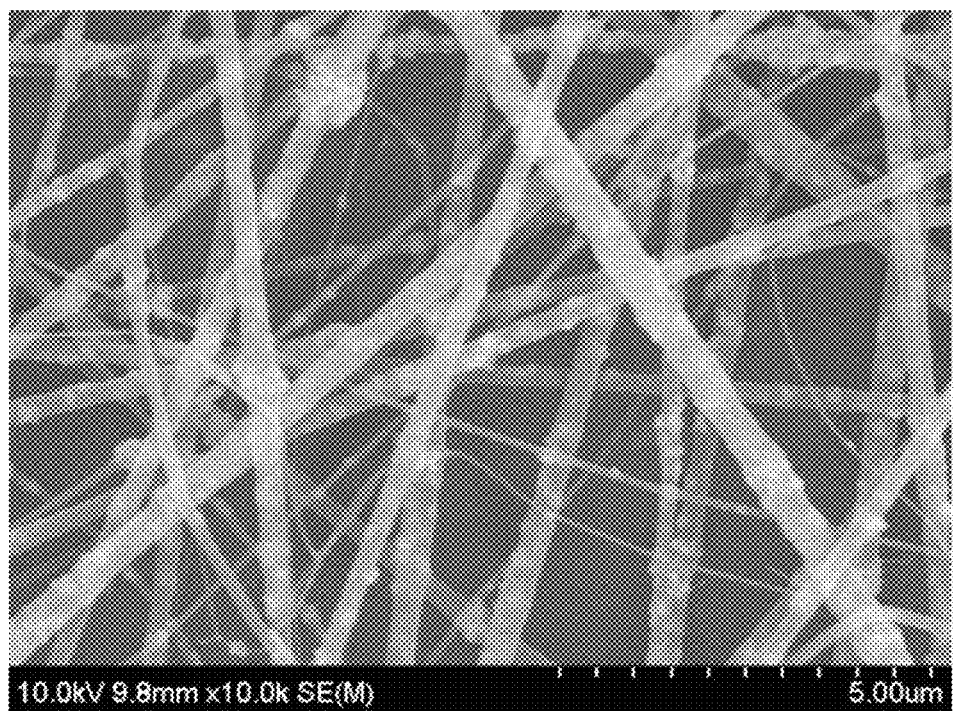

[FIG. 7]
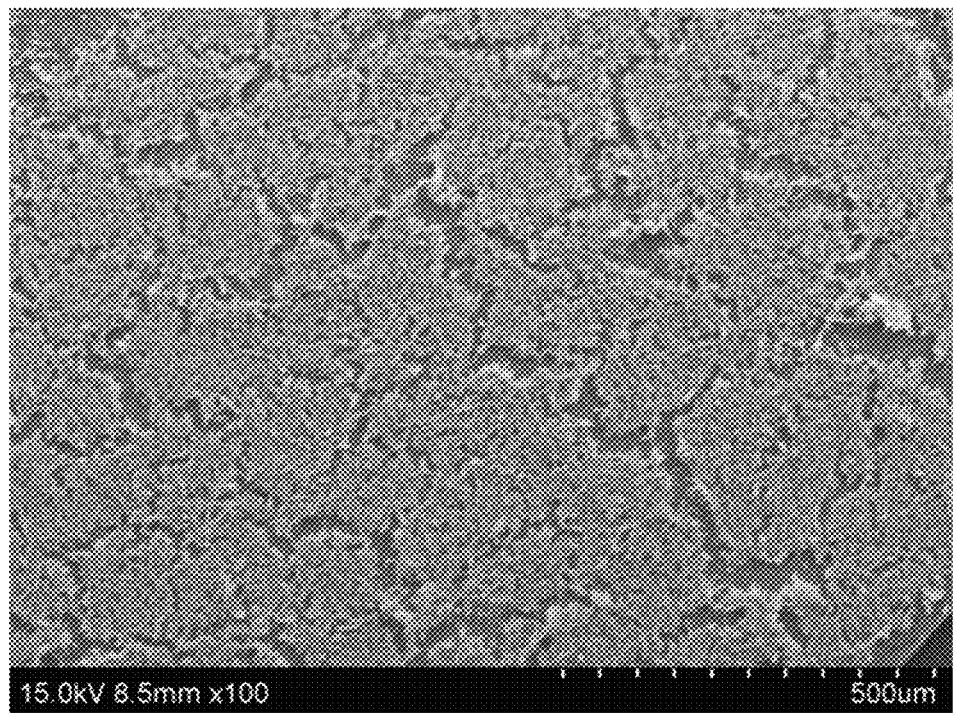

METHOD FOR MANUFACTURING ELECTROLYTE MEMBRANE FOR SOLID OXIDE FUEL CELL, ELECTROLYTE MEMBRANE FOR SOLID OXIDE FUEL CELL, SOLID OXIDE FUEL CELL, AND FUEL CELL MODULE

TECHNICAL FIELD

The present specification claims priority to and the benefits of Korean Patent Application No. 10-2015-0093727, filed with the Korean Intellectual Property Office on Jun. 30, 2015, the entire contents of which are incorporated herein by reference.

The present specification relates to a method for manufacturing an electrolyte membrane for a solid oxide fuel cell, an electrolyte membrane for a solid oxide fuel cell, a solid oxide fuel cell including the electrolyte membrane, and a fuel cell module including the solid oxide fuel cell.

BACKGROUND ART

With recent predictions about the exhaustion of existing energy resources such as petroleum and coal, interests in alternative energy capable of replacing these have been growing. As one of such alternative energy, fuel cells have received attention with advantages of being highly efficient, not emitting pollutants such as NOx and SOx, and having sufficient fuel to use.

Fuel cells are a power generating system converting chemical reaction energy of fuel and oxidizer to electric energy, and hydrogen, methanol and hydrocarbon such as butane are used as the fuel, and oxygen is typically used as the oxidizer.

Fuel cells include polymer electrolyte-type fuel cells (PEMFC), direct methanol-type fuel cells (DMFC), phosphoric acid-type fuel cells (PAFC), alkaline-type fuel cells (AFC), molten carbonate-type fuel cells (MCFC), solid oxide-type fuel cells (SOFC) and the like.

Among these, solid oxide-type fuel cells have high energy conversion efficiency, and interests on the solid oxide-type fuel cells are high.

The solid oxide-type fuel cell is formed with an electrolyte membrane, and a fuel electrode (anode) and an air electrode (cathode) formed on both surfaces of this electrolyte membrane. When referring to FIG. 1 showing a principle of electricity generation of a solid oxide-type fuel cell, air is electrochemically reduced in an air electrode to produce oxygen ions, and the produced oxygen ions are transferred to a fuel electrode through an electrolyte membrane. In the fuel electrode, fuel such as hydrogen, methanol and hydrocarbon such as butane is injected, and the fuel releases electrons while bonding to the oxygen ions and electrochemically oxidized to produce water. Through such a reaction, electrons migrate to an external circuit.

DISCLOSURE

Technical Problem

The present specification is directed to providing a method for manufacturing an electrolyte membrane for a solid oxide fuel cell, an electrolyte membrane for a solid oxide fuel cell, a solid oxide fuel cell including the electrolyte membrane, and a fuel cell module including the solid oxide fuel cell.

Technical Solution

One embodiment of the present specification provides a method for manufacturing an electrolyte membrane for a solid oxide fuel cell including forming an electrolyte membrane using an electrolyte membrane composition including first inorganic particles having oxygen ion conductivity; and forming an electrospinning layer on at least one surface of the electrolyte membrane using a composition for electrospinning including second inorganic particles having oxygen ion conductivity, wherein a content of the second inorganic particles is greater than or equal to 30 wt % and less than or equal to 40 wt % based on a total weight of the composition for electro spinning.

Another embodiment of the present specification provides an electrolyte membrane for a solid oxide fuel cell manufactured according to the manufacturing method described above and including an electrolyte membrane and an electrospinning layer provided on at least one surface of the electrolyte membrane.

Still another embodiment of the present specification provides an electrolyte membrane for a solid oxide fuel cell including an electrolyte membrane and an electrospinning layer provided on at least one surface of the electrolyte membrane, wherein an average diameter of a crystal grain of the electrospinning layer is 80% or greater of an average diameter of a crystal grain of the electrolyte membrane.

Yet another embodiment of the present specification provides a solid oxide fuel cell including the electrolyte membrane.

Still yet another embodiment of the present specification provides a fuel cell module including the solid oxide fuel cell as a unit cell.

Advantageous Effects

An electrolyte membrane according to one embodiment of the present specification has an advantage of increasing a contact area with a fuel electrode or an air electrode.

The electrolyte membrane according to one embodiment of the present specification has an advantage of exhibiting low sheet resistance.

DESCRIPTION OF DRAWINGS

FIG. 1 is a schematic diagram showing a principle of electricity generation of a solid oxide fuel cell.

FIG. 2 is a SEM image of an electrospinning layer electrospun with a composition for electrospinning of Example 1.

FIG. 3 is a SEM image of a sintered electrospinning layer of Example 1.

FIG. 4 is a SEM image of an electrospinning layer electrospun with a composition for electrospinning of Example 2.

FIG. 5 is a SEM image of a sintered electrospinning layer of Example 2.

FIG. 6 is a SEM image of an electrospinning layer electrospun with a composition for electrospinning of Comparative Example 1.

FIG. 7 is a SEM image of a sintered electrospinning layer of Comparative Example 1.

MODE FOR DISCLOSURE

Hereinafter, the present specification will be described in detail.

The present specification provides a method for manufacturing an electrolyte membrane for a solid oxide fuel cell including forming an electrolyte membrane using an electrolyte membrane composition including first inorganic particles having oxygen ion conductivity; and forming an electrospinning layer on at least one surface of the electrolyte membrane using a composition for electrospinning including second inorganic particles having oxygen ion conductivity.

The method for manufacturing an electrolyte membrane for a solid oxide fuel cell of the present specification includes a step of forming an electrolyte membrane using an electrolyte membrane composition including first inorganic particles having oxygen ion conductivity.

The electrolyte membrane may have a thickness of greater than or equal to 1 μm and less than or equal to 300 μm. Specifically, the electrolyte membrane may have a thickness of greater than or equal to 1 μm and less than or equal to 100 μm, and more specifically, the electrolyte membrane may have a thickness of greater than or equal to 1 μm and less than or equal to 50 μm.

The electrolyte membrane composition includes first inorganic particles. Specifically, the first inorganic particles of the electrolyte membrane composition may include the same inorganic particles as at least a part of the second inorganic particles of the composition for electrospinning.

The first inorganic particles may have oxygen ion conductivity of 0.01 S/cm or greater at 600° C. This has an advantage of maximizing an oxygen ion exchange reaction in the same area.

The upper limit of oxygen ion conductivity of the first inorganic particles is not particularly limited since it is better as the upper limit is higher, however, the first inorganic particles preferably have oxygen ion conductivity of 0.05 S/cm or less at 600° C.

The first inorganic particles may each include at least one of yttria-stabilized zirconia (YSZ: $(Y_2O_3)_x(ZrO_2)_{1-x}$, x=0.05 to 0.15), scandia-stabilized zirconia (ScSZ: $(Sc_2O_3)x(ZrO_2)_{1-x}$, x=0.05 to 0.15), samarium-doped ceria (SDC: $(Sm_2O_3)x(CeO_2)1-x$, x=0.02 to 0.4), gadolinium-doped ceria (GDC: $(Gd_2O_3)x(CeO_2)1-x$, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium copper oxide (LSC), gadolinium strontium cobalt oxide (GSC), lanthanum strontium ferrite (LSF), samarium strontium cobalt oxide (SSC), barium strontium cobalt ferrite (BSCF) and lanthanum strontium gallium magnesium oxide (LSGM).

The first inorganic particles may have an average diameter of greater than or equal to 50 nm and less than or equal to 100 nm.

The first inorganic particles may have an individual diameter of greater than or equal to 1 nm and less than or equal to 2 μm.

The first inorganic particles may be perfectly globular particles, or may be oval particles, disc-shaped particles or particles lacking surface smoothness.

A diameter of the first inorganic particle means a longest distance between two points on the surface passing through a center of gravity of the particle.

A content of the first inorganic particles may be greater than or equal to 40 wt % and less than or equal to 60 wt % based on the total weight of the electrolyte membrane composition.

The electrolyte membrane composition may further include a binder resin.

Types of the binder resin are not particularly limited, and common materials known in the art may be used. Examples of the binder resin may be any one of polyvinyl pyrrolidone (PVP), polyacrylonitrile (PAN), polyvinylidene fluoride (PVDF), polyvinyl alcohol, carboxymethylcellulose (CMC), starch, hydroxypropylcellulose, regenerated cellulose, polyvinyl pyrrolidone, tetrafluoroethylene, polyethylene, polypropylene, an ethylene-propylene-diene Monomer rubber (EPDM), sulfonated-EPDM, styrene-butadiene rubber, fluorine rubber and copolymers thereof.

A content of the binder resin may be greater than or equal to 5 wt % and less than or equal to 15 wt % based on the total weight of the electrolyte membrane composition.

The electrolyte membrane composition may further include a solvent, a dispersant and a plasticizer.

The solvent is not largely limited as long as it disperses the first inorganic particles and is readily removed after coating the electrolyte membrane composition, and common materials known in the art may be used. Examples of the solvent may include at least one selected from among water, isopropanol, toluene, ethanol, n-propanol, n-butyl acetate, ethylene glycol, butyl carbitol (BC) and butyl carbitol acetate (BCA).

A content of the solvent may be greater than or equal to 30 wt % and less than or equal to 50 wt % based on the total weight of the electrolyte membrane composition.

The dispersant and the plasticizer are not particularly limited, and common materials known in the art may be used.

The dispersant may be any one of BYK-110 and BYK-111.

A content of the dispersant may be greater than or equal to 1 wt % and less than or equal to 10 wt % based on the total weight of the electrolyte membrane composition.

The plasticizer may be at least one of di-butyl-phthalate (DBP), di-2-ethylhexyl phthalate (DOP), di-isononyl phthalate (DINP), di-isodecyl phthalate (DIDP) and butyl benzyl phthalate (BBP), which are commercial products.

A content of the plasticizer may be greater than or equal to 1 wt % and less than or equal to 10 wt % based on the total weight of the electrolyte membrane composition.

In the electrolyte membrane-forming step, an electrolyte membrane may be formed by coating the electrolyte membrane composition on a releasable substrate. The coating method herein is not particularly limited, and methods generally used in the art may be employed. For example, an electrolyte membrane may be formed by coating the electrolyte membrane composition while controlling a certain thickness using a doctor blade.

After the electrolyte membrane-forming step, a step of drying the electrolyte membrane may be further included. The drying method herein is not particularly limited, and methods generally used in the art may be employed. For example, the electrolyte membrane may be dried by hot-air drying using an oven.

The drying step is a step of preparing an electrolyte membrane sheet having viscosity capable of maintaining an electrolyte membrane form by removing some of the solvent of the electrolyte membrane, and the electrolyte membrane sheet has adhesive strength capable of adhering to a separate sheet or substrate, and may adhere to the separate sheet or substrate through a lamination process.

A drying temperature in the drying step may be higher than or equal to 40° C. and lower than or equal to 100° C. A drying time in the drying step may be longer than or equal to 30 minutes and shorter than or equal to 2 hours.

In the drying step, the electrolyte membrane may be dried for a time of longer than or equal to 30 minutes and shorter than or equal to 2 hours at a temperature of higher than or equal to 40° C. and lower than or equal to 100° C.

After the electrolyte membrane-forming step, a step of sintering the electrolyte membrane may be further included, or after the electrolyte membrane-drying step, a step of sintering the electrolyte membrane may be further included.

In the sintering step, the compositions except for the first inorganic particles of the electrolyte membrane are removed through volatilization, and the first inorganic particles of the electrolyte membrane adhere to each other to be consolidated.

A sintering temperature in the sintering step may be higher than or equal to 1200° C. and lower than or equal to 1500° C.

A sintering time of the sintering step may be longer than or equal to 3 hours and shorter than or equal to 10 hours.

In the sintering step, the electrolyte membrane may be sintered for a time of longer than or equal to 3 hours and shorter than or equal to 10 hours at a temperature of higher than or equal to 1200° C. and lower than or equal to 1500° C.

The electrospinning layer-forming step may form an electrospinning layer by laminating an electrospinning layer, which is formed by electrospinning with the composition for electrospinning on a releasable substrate, on at least one surface of the dried electrolyte membrane, and then removing the releasable substrate; or may form an electrospinning layer by electrospinning with the composition for electrospinning on at least one surface of the dried electrolyte membrane.

The electrospinning layer may be formed on both surfaces of the electrolyte membrane. Specifically, two electrospinning layers, which are formed by electrospinning with the composition for electrospinning on a releasable substrate, are each laminated on both surfaces of the sintered electrolyte membrane, and then the releasable substrate is removed to form an electrospinning layer; or two electrospinning layers may be formed by electrospinning with the composition for electrospinning on both surfaces of the sintered electrolyte membrane.

The electrospinning method is not particularly limited as long as it uses the composition for electrospinning, and the composition for electrospinning is spun using general methods and conditions known in the art.

An applied voltage of the electrospinning may be greater than or equal to 10 Kv and less than or equal to 25 Kv.

A flow rate of the electrospinning may be greater than or equal to 5 μL/h and less than or equal to 10 μL/h.

The electrospinning layer may be formed by the electrospinning composition sprayed toward at least one surface of the electrolyte membrane through an electrospinning nozzle being attached on at least one surface of the electrolyte membrane in a fiber form through electric force, or may be formed by the electrospinning composition sprayed toward a releasable substrate through an electrospinning nozzle being attached on at least one surface of the releasable substrate in a fiber form through electric force.

After forming the electrospinning layer, a step of sintering the electrospinning layer may be further included.

After forming the electrospinning layer, a step of removing the binder resin by sintering the electrospinning layer may be further included. In the sintering step, compositions such as the binder resin and the solvent other than the second inorganic particles of the electrospinning layer may be removed through volatilization, and, although the compositions such as the binder resin and the solvent except for the second inorganic particles of the electrospinning layer are not completely removed herein, the compositions are mostly removed, and therefore, it may be considered that only the second inorganic particles adhere and are consolidated in the sintered electrospinning layer.

A sintering temperature in the electrospinning layer-sintering step may be higher than or equal to 1200° C. and lower than or equal to 1500° C.

A sintering time in the electrospinning layer-sintering step may be longer than or equal to 3 hours and shorter than or equal to 10 hours.

In the electrospinning layer-sintering step, the electrospinning layer may be sintered for a time of longer than or equal to 3 hours and shorter than or equal to 10 hours at a temperature of higher than or equal to 1200° C. and lower than or equal to 1500° C.

After forming the electrospinning layer on at least one surface of the electrolyte membrane, a step of sintering the electrospinning layer and the electrolyte membrane at the same time may be further included.

When the composition for electrospinning includes inorganic particles with no oxygen ion conductivity instead of the second inorganic particles with oxygen ion conductivity, cell performance may decline due to an increase in the resistance at an interface between the electrolyte membrane and a cathode.

When the composition for electrospinning includes a precursor of the second inorganic particles instead of the second inorganic particles, an inorganic substance content is difficult to increase in the solution, and structural defects occur in the electrolyte since the precursor of the second inorganic particles experiences high shrinkage due to a low inorganic substance content.

The composition for electrospinning may include second inorganic particles. Specifically, the second inorganic particles of the composition for electrospinning may include the same inorganic particles as at least a part of the first inorganic particles of the electrolyte membrane composition.

The second inorganic particles may have oxygen ion conductivity of 0.01 S/cm or higher at 600° C. In this case, oxygen ion conduction readily occurs at an interface between the electrolyte membrane and an electrode, and a reaction site may be maximized without cell performance decline.

The upper limit of oxygen ion conductivity of the second inorganic particles is not particularly limited since it is better as the upper limit is higher, however, the second inorganic particles preferably have oxygen ion conductivity of 0.05 S/cm or less at 600° C.

The second inorganic particles may include at least one of yttria-stabilized zirconia (YSZ: $(Y_2O_3)_x(ZrO_2)_{1-x}$, x=0.05 to 0.15), scandia-stabilized zirconia (ScSZ: $(Sc_2O_3)x(ZrO_2)_{1-x}$, x=0.05 to 0.15), samarium-doped ceria (SDC: $(Sm_2O_3)x(CeO_2)1-x$, x=0.02 to 0.4), gadolinium-doped ceria (GDC: $(Gd_2O_3)x(CeO_2)1-x$, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium copper oxide (LSC), gadolinium strontium cobalt oxide (GSC), lanthanum strontium ferrite (LSF), samarium strontium cobalt oxide (SSC), barium strontium cobalt ferrite (BSCF) and lanthanum strontium gallium magnesium oxide (LSGM).

The second inorganic particles may have an average diameter of greater than or equal to 50 nm and less than or equal to 100 nm.

The second inorganic particles may have an individual diameter of greater than or equal to 1 nm and less than or equal to 2 μm.

The second inorganic particles may be perfectly globular particles, or may be oval particles, disc-shaped particles or particles lacking surface smoothness.

A diameter of the second inorganic particle means a longest distance between two points on the surface passing through a center of gravity of the particle.

A content of the second inorganic particles may be greater than or equal to 30 wt % and less than or equal to 40 wt % based on the total weight of the composition for electro spinning. In this case, shrinkage of the electrospinning layer caused by a baking process is readily controlled, and viscosity favorable for electrospinning may be formed.

The composition for electrospinning may further include a binder resin.

The binder resin may include at least one of polyvinyl pyrrolidone (PVP), polyacrylonitrile (PAN) and polyvinylidene fluoride (PVDF).

A content of the binder resin may be greater than or equal to 5 wt % and less than or equal to 20 wt % based on the total weight of the composition for electrospinning. This may minimize a rapid viscosity increase in the solution caused by the inorganic substance addition, and may structurally link all the second inorganic particles.

In the composition for electrospinning, a content of the second inorganic particles may be greater than or equal to 70 wt % and less than or equal to 80 wt % based the weight sum of the second inorganic particles and the binder resin. Specifically, in the composition for electrospinning, a content of the second inorganic particles may be greater than or equal to 70 wt % and less than or equal to 80 wt %, and a content of the binder resin may be greater than or equal to 20 wt % and less than or equal to 30 wt %, based on the weight sum of the second inorganic particles and the binder resin. A content of the inorganic particles needs to be 70 wt % or greater based on the weight sum of the binder resin and the second inorganic particles to control fiber shrinkage of the electrospinning layer formed using the composition for electrospinning during a baking process, and when the content is greater than 80 wt %, all the second inorganic particles may not be structurally linked since the binder resin content relatively decreases, and as a result, a linking property of the fiber of the electrospinning layer declines when electrospinning.

The composition for electrospinning may further include a solvent.

The solvent is not particularly limited as long as it disperses the second inorganic particles and is readily removed after forming the electrospinning layer, and common materials known in the art may be used. For example, the solvent may include at least one selected from among dimethylformamide (DMF), dimethylacetamide (DMAC) and water.

A content of the solvent may be greater than or equal to 20 wt % and less than or equal to 50 wt % based on the total weight of the composition for electrospinning.

The composition for electrospinning may further include a dispersant and a plasticizer.

The dispersant and the plasticizer are not particularly limited, and common materials known in the art may be used.

The dispersant may be at least one of BYK-110 and BYK-111.

A content of the dispersant may be greater than or equal to 1 wt % and less than or equal to 10 wt % based on the total weight of the composition for electrospinning.

The plasticizer may be at least one of di-butyl-phthalate (DBP), di-2-ethylhexyl phthalate (DOP), di-isononyl phthalate (DINP), di-isodecyl phthalate (DIDP) and butyl benzyl phthalate (BBP), which are commercial products.

A content of the plasticizer may be greater than or equal to 1 wt % and less than or equal to 10 wt % based on the total weight of the composition for electrospinning.

The present specification provides an electrolyte membrane for a solid oxide fuel cell manufactured according to the above-mentioned manufacturing method, and including an electrolyte membrane and an electrospinning layer provided on at least one surface of the electrolyte membrane.

The present specification provides an electrolyte membrane for a solid oxide fuel cell including an electrolyte membrane and an electrospinning layer provided on at least one surface of the electrolyte membrane, wherein an average diameter of a crystal grain of the electrospinning layer is 80% or greater of an average diameter of a crystal grain of the electrolyte membrane.

An electrolyte membrane for a solid oxide fuel cell in which an average diameter of a crystal grain of the electrospinning layer is greater than or equal to 80% and less than or equal to 120% of an average diameter of a crystal grain of the electrolyte membrane is provided. This means a percentage of an average diameter of a crystal grain of the electrospinning layer with respect to an average diameter of a crystal grain of the electrolyte membrane.

The average diameter of the crystal grain of the electrospinning layer may be greater than or equal to 1 μm and less than or equal to 10 μm.

The average diameter of the crystal grain of the electrolyte membrane may be greater than or equal to 1 μm and less than or equal to 10 μm.

In the present specification, a crystal grain means an aggregate of crystal lattices growing from one crystal nucleus on a cross section of the electrospinning layer or the electrolyte membrane, and a crystal grain is formed while many inorganic particles adhere to each other when the inorganic particles are sintered in the electrospinning layer or the electrolyte membrane.

The electrolyte membrane and the electrospinning layer each include inorganic substances having oxygen ion conductivity, and at least a part of the inorganic substances of the electrospinning layer may be the same as at least a part of the inorganic substances of the electrolyte membrane.

The inorganic substances having oxygen ion conductivity may include at least one of yttria-stabilized zirconia (YSZ: $(Y_2O_3)_x(ZrO_2)_{1-x}$, x=0.05 to 0.15), scandia-stabilized zirconia (ScSZ: $(Sc_2O_3)x(ZrO_2)_{1-x}$, x=0.05 to 0.15), samarium-doped ceria (SDC: $(Sm_2O_3)x(CeO_2)$ 1-x, x=0.02 to 0.4), gadolinium-doped ceria (GDC: $(Gd_2O_3)x(Ceo_2)$ 1-x, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium copper oxide (LSC), gadolinium strontium cobalt oxide (GSC), lanthanum strontium ferrite (LSF), samarium strontium cobalt oxide (SSC), barium strontium cobalt ferrite (BSCF) and lanthanum strontium gallium magnesium oxide (LSGM).

The electrospinning layer may be provided on both surfaces of the electrolyte membrane.

A thickness of the electrospinning layer may be 20% or less of a thickness of the electrolyte membrane. Specifically, a thickness of the electrospinning layer may be greater than or equal to 1% and less than or equal to 20% of a thickness of the electrolyte membrane. This means a percentage of a thickness of the electrospinning layer with respect to a thickness of the electrolyte membrane.

In the electrospinning layer, many fiber forms are randomly attached, and any one fiber and a neighboring fiber are separated producing empty space.

A thickness of the fiber forming the electrospinning layer may be greater than or equal to 500 nm and less than or equal to 2 µm.

The present specification provides a solid oxide fuel cell including the electrolyte membrane. Specifically, the present specification provides a solid oxide fuel cell including the electrolyte membrane provided with the electrospinning layer of the present specification on at least one surface.

The electrospinning layer provided on at least one surface of the electrolyte membrane may be any one of an electrolyte membrane, an air electrode and a fuel electrode.

The electrospinning layer provided on at least one surface of the electrolyte membrane may be an additional electrolyte membrane provided on the electrolyte membrane.

The electrospinning layer provided on at least one surface of the electrolyte membrane may be at least one of an air electrode and a fuel electrode provided on the electrolyte membrane.

The present specification provides a solid oxide fuel cell including an air electrode; a fuel electrode; and the electrolyte membrane provided between the air electrode and the fuel electrode.

The solid oxide fuel cell is formed with an electrolyte membrane, and a fuel electrode (anode) and an air electrode (cathode) formed on both surfaces of this electrolyte membrane. When referring to FIG. 1 showing a principle of electricity generation of a solid oxide-type fuel cell, air is electrochemically reduced in an air electrode to produce oxygen ions, and the produced oxygen ions are transferred to a fuel electrode through an electrolyte membrane. In the fuel electrode, fuel such as hydrogen, methanol and hydrocarbon such as butane is injected, and the fuel releases electrons while bonding to the oxygen ions and electrochemically oxidized to produce water. Through such a reaction, electrons migrate to an external circuit.

Materials of the air electrode and the fuel electrode are not particularly limited, and those generally used in the art may be employed.

One or more functional layers may be further provided at least one of between the air electrode and the electrolyte membrane and between the fuel electrode and the electrolyte membrane.

The present specification provides a fuel cell module including the solid oxide fuel cell as a unit cell.

The fuel cell module may include a stack including a unit cell including the solid oxide fuel cell, and a separator provided between the unit cells; a fuel supply unit supplying fuel to the stack; and an oxidizer supply unit supplying an oxidizer to the stack.

The fuel cell module may specifically be used as a power supply of electric vehicles, hybrid electric vehicles, plug-in hybrid electric vehicles or power storage devices.

Hereinafter, the present specification will be described in more detail with reference to examples. However, the following examples are for illustrative purposes only, and the scope of the present specification is not limited thereto.

EXAMPLE

Example 1

In order to form an electrolyte membrane, a sample was made by uniaxial mold extruding GDC (Rhodia) powder as first inorganic particles into a disc shape and was sintered at 1500° C. Therethrough, an electrolyte membrane having a thickness of 500 µm to 550 µm and having density of 99% or greater after the sintering was formed.

On the electrolyte membrane, a composition for electrospinning including GDC and LSCF mixed in 15.5 wt % and 15.5 wt %, respectively, based on the total weight as second inorganic particles, PVP (12 wt %) as a binder resin, a plasticizer (6 wt %), a dispersant (6 wt %) and DMF (45 wt %) as a solvent was introduced to a syringe, and was electrospun to form an electrospinning layer under the following condition, and the result was sintered at 1300° C.

Applied voltage: 15 Kv
Flow rate: 5 µL/min

Example 2

An experiment was carried out in the same manner as in Example 1 except that, in the composition for electrospinning of Example 1, a mass of the second inorganic particles was 38 wt %, a content of the plasticizer was 2 wt % and a content of the dispersant was 3 wt %.

Comparative Example 1

An experiment was carried out in the same manner as in Example 1 except that, in the composition for electrospinning of Example 1, a mass of the second inorganic particles was 25 wt %, a content of the plasticizer was 9 wt % and a content of the dispersant was 9 wt %.

Comparative Example 2

A composition for electrospinning was prepared in the same manner as in Example 1 except that, in the composition for electrospinning of Example 1, a mass of the second inorganic particles was greater than 40 wt %, and when electrospinning was carried out using the composition for electrospinning on the electrolyte membrane, electrospinning was impossible due to a rapid viscosity increase in the composition.

Test Example 1

A SEM image of the electrospinning layer electrospun with the composition for electrospinning of Example 1 is shown in FIG. 2, and a SEM image of the sintered electrospinning layer of Example 1 is shown in FIG. 3.

A SEM image of the electrospinning layer electrospun with the composition for electrospinning of Example 2 is shown in FIG. 4, and a SEM image of the sintered electrospinning layer of Example 2 is shown in FIG. 5.

As shown in FIG. 3 and FIG. 5, it was seen that the electrospinning layer maintained a form of an electrospinning layer without surface cracks after the sintering.

A SEM image of the electrospinning layer electrospun with the composition for electrospinning of Comparative Example 1 is shown in FIG. 6, and a SEM image of the sintered electrospinning layer of Comparative Example 1 is shown in FIG. 7. As shown in FIG. 7, it was seen that the surface of the electrospinning layer cracked due to high shrinkage after the sintering.

The invention claimed is:

1. A method for manufacturing an electrolyte membrane for a solid oxide fuel cell comprising:
    forming an electrolyte membrane using an electrolyte membrane composition including first inorganic particles having oxygen ion conductivity;
    forming an electrospinning layer on at least one surface of the electrolyte membrane using a composition for electrospinning including second inorganic particles having oxygen ion conductivity and a binder resin,
    wherein a content of the second inorganic particles is greater than or equal to 30 wt % and less than or equal to 40 wt % based on a total weight of the composition for electrospinning; and
    sintering the electrospinning layer at a temperature higher than or equal to 1200° C. and lower than or equal to 1500° C.; and
    wherein, in the composition for electrospinning, a content of the second inorganic particles is greater than or equal to 70 wt % and less than or equal to 80 wt % based upon a weight sum of the second inorganic particles and the binder resin.

2. The method for manufacturing an electrolyte membrane for a solid oxide fuel cell of claim 1, wherein the second inorganic particles of the composition for electrospinning include the same inorganic particles as at least a part of the first inorganic particles of the electrolyte membrane composition.

3. The method for manufacturing an electrolyte membrane for a solid oxide fuel cell of claim 1, wherein the first inorganic particles and the second inorganic particles each have oxygen ion conductivity of 0.01 S/cm or greater at 600° C.

4. The method for manufacturing an electrolyte membrane for a solid oxide fuel cell of claim 1, further comprising drying the electrolyte membrane after the forming of the electrolyte membrane.

5. The method for manufacturing an electrolyte membrane for a solid oxide fuel cell of claim 4, wherein the forming of the electrospinning layer forms an electrospinning layer by laminating an electrospinning layer, which is formed by electrospinning with the composition for electrospinning on a releasable substrate, on at least one surface of the dried electrolyte membrane, and then removing the releasable substrate; or forms an electrospinning layer by electrospinning with the composition for electrospinning on at least one surface of the dried electrolyte membrane.

6. The method for manufacturing an electrolyte membrane for a solid oxide fuel cell of claim 5, wherein the electrospinning layer and the electrolyte membrane are sintered at the same time after the forming of the electrospinning layer.

7. The method for manufacturing an electrolyte membrane for a solid oxide fuel cell of claim 1, wherein the forming of the electrospinning layer forms an electrospinning layer by laminating an electrospinning layer, which is formed by electrospinning with the composition for electrospinning on a releasable substrate, on at least one surface of the sintered electrolyte membrane, and then removing the releasable substrate; or forms an electrospinning layer by electrospinning with the composition for electrospinning on at least one surface of the sintered electrolyte membrane.

8. The method for manufacturing an electrolyte membrane for a solid oxide fuel cell of claim 7, further comprising sintering the electrospinning layer after the forming of the electrospinning layer.

9. The method for manufacturing an electrolyte membrane for a solid oxide fuel cell of claim 1, wherein the first inorganic particles and the second inorganic particles each include at least one of yttria-stabilized zirconia (YSZ: $(Y_2O_3)_x(ZrO_2)_{1-x}$, x=0.05 to 0.15), scandia-stabilized zirconia (ScSZ: $(Sc_2O_3)_x(ZrO_2)_{1-x}$, x=0.05 to 0.15), samarium-doped ceria (SDC: $(Sm_2O_3)_x(CeO_2)_{1-x}$, x=0.02 to 0.4), gadolinium-doped ceria (GDC: $(Gd_2O_3)_x(CeO_2)_{1-x}$, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium copper oxide (LSC), gadolinium strontium cobalt oxide (GSC), lanthanum strontium ferrite (LSF), samarium strontium cobalt oxide (SSC), barium strontium cobalt ferrite (BSCF) and lanthanum strontium gallium magnesium oxide (LSGM).

\* \* \* \* \*